United States Patent Office.

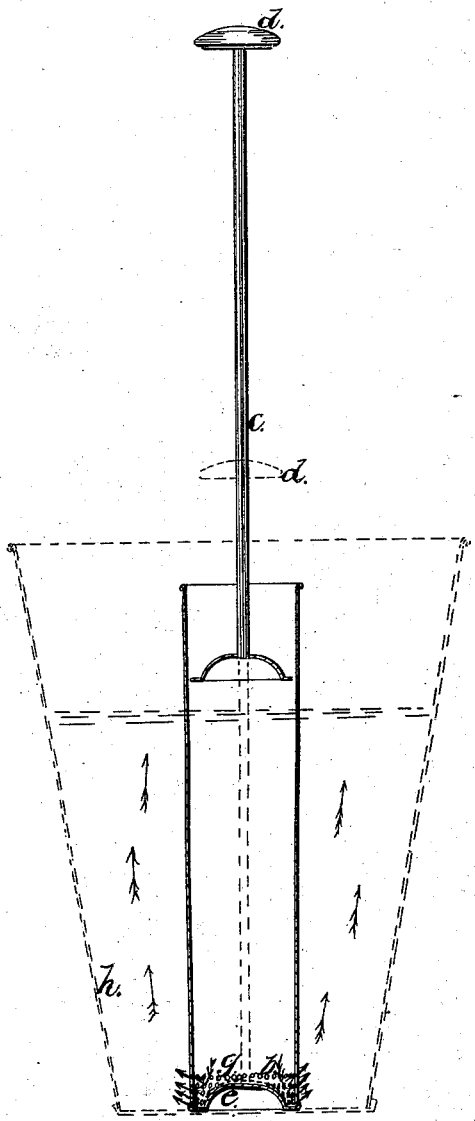

E. L. PRATT, OF BOSTON, MASSACHUSETTS.

Letters Patent No. 68,788, dated September 10, 1867.

---

IMPROVED APPARATUS FOR AERATING LIQUIDS.

---

The Schedule referred to in these Letters Patent and making part of the same.

---

TO ALL WHOM IT MAY CONCERN:

Be it known that I, E. L. PRATT, of Boston, in the county of Suffolk, and State of Massachusetts, have invented an improved Aerating Apparatus; and I do hereby declare that the following, taken in connection with the drawings which accompany and form part of this specification, is a description of my invention sufficient to enable those skilled in the art to practise it.

United States Letters Patent No. 59,449 were granted to me November 6, 1866, on an improved apparatus for aerating and mixing fluid and semi-fluid matters. In such apparatus, and by the action of a plunger, a small body of air is minutely divided, and the divisions or jets are forced into the mass contained in a mixing-vessel, through which the plunger is operated.

My present invention is in the nature of an improvement upon such patented apparatus, the object being to enable the aerator to be used within a larger vessel, and in such manner as to force the air through the sides of the aerating vessel, up into and through the fluid contents of said larger vessel.

My improvement consists in forming the cup-shaped or concave plunger solid, or without apertures, in combination with placing around the sides of the aerating vessel a series of apertures, in or near the same horizontal plane with the convex bottom of the vessel, these apertures being so arranged that when the plunger, with its enclosed air, reaches the convex bottom, the expelled air is driven laterally through these apertures into the larger vessel, aerating the fluid contained therein.

The drawing represents a vertical central section of an aerator embodying my improvement.

$a$ denotes the aerating vessl, $b$ the plunger, fixed upon the end of a rod, $c$, having a handle, $d$, by which the plunger is reciprocated. The bottom of the vessel is made to extend upwards in convex form, as seen at $e$, and the bottom of the plunger is made dishing or concave, to correspond with said bottom $e$, so that upon bringing the plunger to the bottom of the vessel, any air or other fluid within the convexity of the plunger will be driven therefrom. Now, instead of making holes through the rim $f$ of the plunger, I leave said rim (if the plunger be constructed with a rim) solid, having no holes whatever through the plunger, and through the sides of the vessel, near the bottom, I make a series of holes, $g$, as seen in the drawing. The vessel is made of a diameter at its lower end corresponding to the diameter of the plunger, and enlarges upwards therefrom, as shown, so that while the plunger may reciprocate freely within the vessel, it fills the same when it reaches the bottom thereof.

In using the aerator it is placed within a larger vessel, $h$, containing the fluid to be aerated. When the plunger is drawn up above the liquid, the hollow in the plunger of course fills with air, and upon pushing down the plunger through the liquid, said air is of course carried with it, until, as the plunger comes into contact with the bottom $e$, the air will be forced out, when, being stopped in other directions, it will press through the perforations $g$ into the fluid in the vessel $h$, in minute jets, which rise through the same, as will be readily understood, the repeated reciprocations of the piston soon aerating the fluid throughout, the air ascending like drops of rain reversed.

It will be obvious that by this construction the instrument or apparatus may be readily used for aerating a much greater quantity of liquid than can be contained in itself, the instrument being thus made available under many circumstances in which the old apparatus could not be practically used.

I claim, in combination with the concave plunger and the convex bottom, the apertures through the vessel, arranged and operating as air-passages, substantially as described.

E. L. PRATT.

Witnesses.
J. B. CROSBY,
FRANCIS GOULD.